United States Patent [19]

Bowen

[11] 3,926,902
[45] Dec. 16, 1975

[54] CROSSLINKABLE THERMOPLASTIC COMPOSITIONS AND PROCESSES THEREFOR

[75] Inventor: Stephen T. Bowen, Evansville, Ind.

[73] Assignee: Dart Industries, Inc., Los Angeles, Calif.

[22] Filed: Feb. 4, 1974

[21] Appl. No.: 439,479

Related U.S. Application Data

[63] Continuation of Ser. No. 206,507, Dec. 9, 1971, abandoned.

[52] U.S. Cl. ............................... 260/40 R; 260/861
[51] Int. Cl.² .......................................... C08L 67/06
[58] Field of Search ............ 261/40 R; 260/861, 872

[56] References Cited
UNITED STATES PATENTS

| | | | |
|---|---|---|---|
| 3,153,005 | 10/1964 | Minter | 260/40 R |
| 3,264,372 | 8/1966 | Deichert et al. | 260/872 |
| 3,331,891 | 7/1967 | Thomas et al. | 260/40 R |

FOREIGN PATENTS OR APPLICATIONS

| | | | |
|---|---|---|---|
| 959,539 | 6/1964 | United Kingdom | 260/40 |
| 1,082,997 | 9/1967 | United Kingdom | 260/40 |
| 1,045,647 | 10/1966 | United Kingdom | 260/40 |
| 720,566 | 12/1954 | United Kingdom | 260/40 |

*Primary Examiner*—Lewis T. Jacobs
*Attorney, Agent, or Firm*—Arthur S. Collins; Fred S. Valles; Bryant W. Brennan

[57] ABSTRACT

A crosslinkable thermoplastic composition is described comprising (1) an unsaturated thermosettable polyester, (2) a polymerizable crosslinking agent, (3) a free-radical initiator, and (4) a filler material and/or a reinforcing agent selected from organic and inorganic fibers, which composition is a free-flowing solid at room temperature and has a melting point above about 65°C (150°F). The composition is especially useful in injection molding operations.

16 Claims, No Drawings

CROSSLINKABLE THERMOPLASTIC COMPOSITIONS AND PROCESSES THEREFOR

This is a continuation of application Ser. No. 206,507 filed Dec. 19, 1971 and subsequently abandoned.

This invention relates to crosslinkable thermoplastic compositions which are dry and free-flowing. More particularly, the invention relates to reinforced compositions which are specifically suitable for injection molding techniques although they also have utility in compression or transfer molding operations.

Heretofore, various thermosettable polyester compositions have been known which, when molded, possess desirable mechanical and electrical properties. However, the molding of these compositions has generally been restricted to compression or transfer molding techniques due to the difficulties encountered in attempting to process them on injection molding equipment. One of the most common difficulties is that these prior art compositions are not self-feeding, i.e., free-flowing, due to the presence of a normally liquid crosslinking monomer, such as styrene or vinyl toluene and the like, which cause the compositions to be tacky. Lacking the desired free-flowing characteristics, the prior art compositions do not self-feed in an injection molding device and the presence of an attendant would be required to assure proper feeding of the device.

Thus, in accordance with this invention, there is provided a crosslinkable thermoplastic composition which is dry and free-flowing and highly suitable for injection molding operations. Briefly, the composition comprises (1) an unsaturated, thermosetting polyester, (2) a polymerizable crosslinking agent, (3) a free-radical initiator, and (4) a filler material and/or a reinforcing agent selected from organic and inorganic fibers, the combination of which is a free-flowing solid at room temperature with melting point of above about 65°C. In general, the composition is prepared by melt blending the materials or by melt blending all of the materials except the reinforcing fibers and/or the filler material and then impregnating or blending them in, the total operation being performed at a temperature below that at which crosslinking is initiated. The composition is then resolidified by cooling and subdivided by granulation or pelletization into a suitable size for injection molding, or compression or transfer molding or possibly rotomolding or extrusion. It is pointed out that the composition is prepared under conditions that retain the thermoplastic characteristics of the polyester, i.e., reversible melting and solidification, even though the composition is thermosettable. In this regard the composition of this invention has been designated as a crosslinkable thermoplastic.

THE POLYESTER PORTION OF THE COMPOSITION

The polyester portion of the compositions of this invention include any unsaturated polyester which normally melts at a temperature above about 65°C (150°F). These polyesters are well known and many are commercially available. In general, they include the condensation products of one or more poly-basic carboxylic acids or acid anhydrides and one or more polyhydric alcohols provided that unsaturation is present for crosslinking. These unsaturated polyesters may additionally contain radicals of monovalent carboxylic acids and/or radicals of monovalent alcohols and/or radicals of hydroxy-carboxylic acids. Polyester suitable for use in the invention are described in "Polyesters and Their Applications" by Bjorksten Research Laboratories, Inc., Reinhold Publishing Corporation, 1956, pages 21-194 and also in "Unsaturated Polyesters" by H. V. Boenig, Elsevier Publishing Company, 1964.

The preferred polyesters are those melting at a temperature above about 65°C (150°F) and are derived from at least one dihydric alcohol and at least one dicarboxylic acid or esterforming derivative thereof (acid anhydride and acid chloride). The preferred polyester resins contain functionality that will crosslink with a polymerizable monomer. This functionality may include $\alpha,\beta$-ethylenic unsaturated dicarboxylic acid-type materials, or functionality derived from a diene polymer or copolymer, or allyl ester, e.g., diallylphthalate. The dihydric alcohols which may be used comprise ethylene glycol, propylene glycol, butylene glycols, diethylene glycol, triethylene glycol, polyethylene glycols and unsaturated glycols, such as vinylethylene glycol or 1-allyl-2,3-propanediol. The $\alpha$, $\beta$-ethylenically unsaturated dicarboxylic acid-type materials which may be used include maleic acids, maleic anhydride, fumaric acid, fumaric anhydride, citraconic acid, citraconic anhydride and itaconic acid. Although the unsaturated acid-type material may constitute the sole acidic reactant, other acidic reactants may be additionally included, such as o-, m-, and p-phthalic acid or anhydride, tetrachlorophthalic anhydride, tetrahydrophthalic acid, indomethylene tetrahydrophthalic acid, as well as straight chain aliphatic dicarboxylic acids and anhydrides, such as succinic, adipic, azelaic and sebacic acids and anhydrides. The ester forming dicarboxylic acid materials include the acids, anhydrides, and acid halides thereof, all of which are ester forming.

It is also within the scope of the invention to employ unsaturated polyesters as described above which have additionally been modified during their preparation with monohydric alcohols and monocarboxylic acids.

THE CROSSLINKING AGENT

The crosslinking agents or monomers suitable in the compositions are those which are defined by one of the following structures:

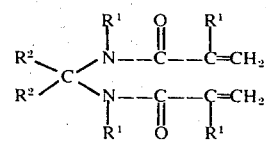

wherein each $R^1$, independently, is H or $CH_3$, and each $R^2$, independently, is H; $C_1$-$C_4$ alkyl;phenyl;phenyl substituted with halogen, hydroxy, nitro, or $C_1$-$C_4$ alkyl; $C_4$-$C_6$ cycloalkyl; or a radical defined by

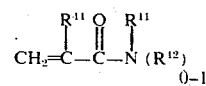

wherein each $R^{11}$, independently, is H or $CH_3$ and $R^{12}$ is a straight or branched $C_1$-$C_8$ alkylene group;

II 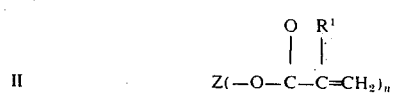

wherein n is an integer of 2 to 10 and Z is a polyvalent aliphatic, cycloaliphatic, or aromatic nuclei; preferably

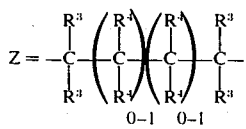

wherein each $R^3$ and $R^4$, independently, is H or $C_1$–$C_4$ alkyl; the cycloaliphatic nuclei is cyclohexylene or bismethylene cyclohexane; and the aromatic nuclei is phenylene or phenylene substituted with up to 4 methyl groups, or bismethylene benzene or bismethylene benzene substituted with up to 4 methyl groups;

(III)   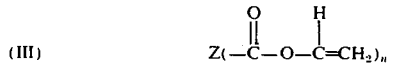

wherein n is an integer of 2 to 10 and Z is an aliphatic nuclei preferably

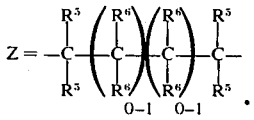

wherein each $R^5$ and $R^6$, independently, is H or $C_1$–$C_4$ alkyl; and

IV. The condensation product of hydroxymethyl diacetone acrylamide (hereinafter referred to as HMDAA), having a molecular weight in the range of 400 to 3000.

V. The allyl monomers; e.g., diallyl phthalate (DAP), diallyl isophthalate (DAIP); prepolymers of DAP and DAIP; and triallyl cyanurate.

The following structures are specific examples of structures I, II, III and IV set forth above:

(I)   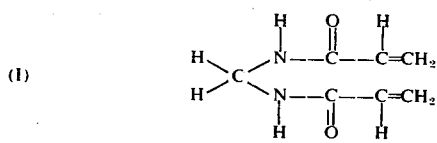

methylene bis acrylamide (II)   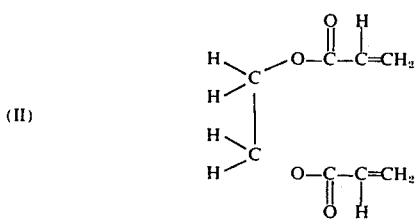

ethylene glycol bis acrylate (III)   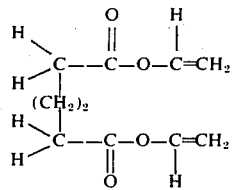

divinyl adipate,

IV. the base catalyzed auto-condensation product of hydroxymethyl diacetone acrylamide having a molecular weight in the range of 400 to 1000. The condensation reaction is essentially all from the hydroxymethyl group rather than from the vinyl polymerization in the acrylic group, and (V)   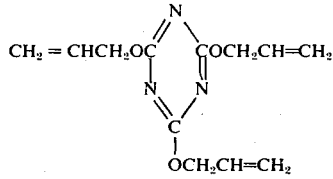

triallyl cyanurate

The relative percentages of polyester resin and crosslinking agent may vary over a wide ratio and is generally dependent upon the specific materials employed and the degree of crosslinking desired in the final molded products. Normally, increasing the percentage of the crosslinking agent will increase the extent of crosslinking in the final products. Highly crosslinked products generally will exhibit high heat distortion temperatures, improved modulus of elasticity and resistance to chemical or solvent attack. Suitable ratios of polyester resin to crosslinking agent may vary from about 30/70 to about 95/5, preferably from 50/50 to 90/10.

The free radical initiators useful in the invention include any compound capable of generating free radicals that can initiate crosslinking between the crosslinking monomer and the polyester resin, but which will not cause any significant crosslinking of the composition at temperatures below about 200° to 225°F (93°C to 107°C). In other words, the free radical initiators must be such that they are sufficiently stable at those temperatures at which the compositions of this invention are initially formulated so that the compositions do not prematurely crosslink and become thermoset. In general, any peroxide type initiator having a 10 hour half-life temperature above about 200°F will be suitable as the temperatures at which the compositions of this invention are formed are usually below 93°C (200°F). Of course, if a higher temperature is employed to formulate the composition, then a peroxide type initiator having a higher 10 hour half-life temperature should be used. Some examples of suitable peroxides (10 hour half-life temperature shown in parenthesis) include t-butyl peracetate (102°C); methyl ethyl ketone peroxides (105°C); t-butyl perbenzoate (105°C); 2,5-dimethyl-2,5-bis(t-butylperoxy) hexane (119°C); di-t-butyl peroxide (126°C); 2,5-dimethyl-2,5-bis(t-butylperoxy) hexyl-3 (128°C); 2,4-pentanedione peroxide (130°C); t-butyl hydroperoxide (172°C); 2,5-dimethyl-2,5-bis(benzoylperoxy) hexane (100°C); t-butyl percrotonate (98°C); di-t-butyl diperoxyphthalate (105°C); a,a'-bis(t-butylperoxy) diisopropylbenzene (120°C); n-butyl-4,4-bis(t-butylperoxy) valerate (108°C); dicumyl peroxide (113°C); 1,1,3,3-tetramethyl butyl hydroperoxide (131°C); cumene hydroperoxide (158°C); 2,5-dimethylhexane-2,5-dihydroperoxide (154°C); acetyl acetone peroxide. (130°C); and t-butyl peroxy isopropyl carbonate. While some of these peroxides are normally liquids the amounts generally employed in the compositions of this invention are such that the dry appearance and free-flowing characteristics of the compositions are not altered. In general, amounts from about 0.01 to about 5% by weight based on the combined weight of the polyester and the crosslinking agent of the composition of this invention are employed, preferably 0.1 to 2% by weight.

Reinforcing materials such as glass fibers, asbestos, synthetic fibers and graphite fibers are present in the compositions to improve various mechanical properties, e.g., tensile and flexural strengths. Incorporation of these reinforcing materials into the composition may be by any of the known techniques. In the case of glass fibers, either chopped glass fibers may be directly blended with the other components to form the composition of this invention or continuous roving may be impregnated with a pre-blended mixture of the remaining components. Such techniques are described in U.S. Pat. No. 2,877,501, U.S. Pat. No. 3,416,990, U.S. Pat. No. 3,453,356 and U.S. Pat. No. 3,042,570. In general, reinforcing materials may be incorporated in quantities of from 5% to 75% by weight of the composition. Less than about 5% will not contribute any significant improvement in mechanical properties while 60% represents a practical upper limit although quantities up to 75% based on the weight of the composition of this invention may be employed in special circumstances, depending upon the ultimate molded product to be produced from the compositions.

While the basic compositions of this invention include the polyester component, the crosslinking agent, the reinforcing and/or filler material and the free radical initiator, the compositions may also include other additives such as lubricants, mold release agents, coupling agents (silanes), colorants, flame retardants and the like. Low profile additives may be included which enhance the surface appearance of the ultimate molded product by migrating to the product surface during the final molding and curing. Such additives are low molecular weight polyolefins, acrylic resins, microcrystalline waxes and polycaprolactone resins.

At times it may be desirable to include a stabilizing amount of a stabilizer to prevent premature crosslinking of the polyester, particularly when the polyester and/or crosslinking agent are highly reactive. Suitable stabilizers are those which function as free radical absorbers such as hydroquinone, hydroquinone monomethyl ether, butylated hydroxy toluene (BHT), butylated hydroxy anisole (BHA), and other substituted phenols, e.g., 2,6-di-t-butyl-4-methyl phenol and other well known compounds of this type.

The fillers which may be incorporated into the compositions of this invention in place of or in addition to the reinforcing agent include such inorganic materials as calcium carbonate, calcium silicate, clay, aluminum silicate, magnesium silicate, silica, hydrated kaolin, wood flour, aluminum trihydrate, antimony trioxide, zinc borate, mica, and the like. Proper selection of a filler can result in improvement in various characteristics of the composition when ultimately molded into a product. For example, fillers contribute to an improvement in surface smoothness and gloss to a reduction of shrinkage and warping and to a reduction in the occurrence of sink marks in the molded products. Fillers may be used in quantities of from 5% to about 80% by weight of the overall composition, preferably from 15% to about 75% by weight.

The use of both fillers and reinforcing fibers represents a preferred embodiment of the invention. In this instance the total filler material and reinforcing fibers preferably ranges from about 10% to about 80% by weight of the composition, more preferably from about 40% to 80% by weight.

The combined weight of the polyester resin and the crosslinking agent is preferably maintained at from about 20–90% by weight of said composition.

As indicated hereinbefore, the compositions of this invention may be prepared by melt blending the various components using conventional equipment such as a Brabender Plastograph, Banbury, or mixing extruder followed by granulating or pelletizing into a suitable size for subsequent forming, e.g., injection molding. When reinforcing fibers are included in the composition techniques should be used to avoid undue attrition of the fibers. In any event, whatever method is employed care should be exercised not to reach or exceed those temperatures at which the composition will begin to crosslink and become thermoset. In general, temperatures up to about 93°C to 107°C (200°F to 220°F) should be sufficient to process most components for the composition. However, in the case of more highly reactive components and peroxides having 10 hour half-lives close to 93°C (200°F), lower processing temperatures should be employed to insure that the composition remains in the thermoplastic region. Appropriate selection of components of the composition will enable one skilled in the art to readily determine the proper conditions of formulation.

The following examples will serve to further illustrate and describe the invention.

EXAMPLE 1

A composition in accordance with this invention was prepared by tumble blending on a dry basis the following ingredients:

| Component | Parts by Weight |
|---|---|
| Polyester[1] | 24.9 |
| Crosslinking Agent (condensate of HMDAA[2] | 24.9 |
| Inorganic Filler (CaSiO$_3$-Calcium Metasilicate) | 34.6 |
| Reinforcement (chopped glass fibers) | 15.0 |
| Initiator [2,5-dimethyl-2,5-di(t-butyl peroxy) hexane] | 0.26 |
| Stabilizer (2,6-di-t-butyl-4-methyl phenol=Ionol) | 0.03 |
| Other Additive (Vinyl Silane) | 0.20 |
| | 99.89 |

Notes:
[1]The commercially available polyester was derived from 1 mole of maleic anhydride, 1 mole of isophthalic acid and 2.1 moles of propylene glycol.
[2]The crosslinking agent was prepared in a manner described in lines 19 to 23 on page 8 above.

The above mixture was then fed to an extruder whereupon the ingredients were melt blended to a uniform blend and dispersion and then extruded into strands. The strands were solidified by cooling and then pelletized. The temperatures during the extrusion process were held to below 220°F. (about 107°C).

The resulting pelletized composition was dry appearing and free-flowing and still thermoplastic in nature. The composition was capable of being molded into various shapes and being cured to a thermoset condition. For example, with a standard injection molding machine operating at the following conditions:

| | |
|---|---|
| Barrel Temp. (°F) | 140–220 |
| Nozzle Temp. (°F) | 180–220 |
| Mold Temp. (°F) | 320–340 |
| Injection Pressure (psi) | 6000 |

The pelletized composition was heat plasticized and injected into the mold cavity. As a result of the high temperatures in the mold the free radical initiator decomposed to generate free radicals which caused crosslinking of the polyester with the crosslinking agent thereby resulting in a thermoset product that was fiber reinforced and contained an inorganic filler.

EXAMPLE 2

Using a somewhat different technique than that described in Example 1, another composition in accordance with the invention was prepared by melt blending the following ingredients using a planetary mixer:

| Component | Parts by Weight |
|---|---|
| Polyester[1] | 32.6 |
| Crosslinking Agent (condensate of HMDAA) | 32.6 |
| Inorganic Filler (CaSiO$_3$-Calcium Metasilicate) | 33.8 |
| Initiator [2,5-dimethyl-2,5-di(t-butyl peroxy) hexane] | 0.3 |
| Stabilizer (Ionol) | 0.03 |
| Other Additive (Vinyl Silane) | 0.3 |
| | 99.63 |

[1]The commercially available polyester was derived from 1 mole of maleic anhydride, 1 mole of isophthalic acid and 1 mole of propylene glycol.

The blended mixture was then used to impregnate a continuous glass fiber roving followed by solidification by cooling and pelletizing. The initial melt blending and subsequent impregnation were conducted at temperatures sufficiently low to prevent premature crosslinking. The resultant pelletized composition containing 15 wt. % glass fibers based on the total weight of the composition was dry-appearing, freeflowing and thermoplastic in nature and capable of being shaped into articles and simultaneously crosslinked to a thermoset condition.

EXAMPLE 4

The versatility of the compositions of this invention is shown by remelting the pelletized composition of Example 1 at relatively low temperatures without causing crosslinking and impregnating a continuous glass fiber roving to incorporate an additional 15 parts by weight glass fibers. The impregnated roving was then cooled to solidify the molten material and pelletized to form a composition reinforced with both long fibers extending substantially the full length of the pellets and fibers which are of intermediate length. The pelletized composition was dry-appearing and free-flowing.

EXAMPLE 5

In another example of the invention the following ingredients were melt blended using a planetary mixer and temperatures insufficient to cause crosslinking:

| Component | Parts by Weight |
|---|---|
| Polyester[1] | 28.2 |
| Crosslinking Agent (condensate of HMDAA) | 28.2 |
| Inorganic Filler (CaSiO$_3$-Calcium Metasilicate) | 29.6 |
| Reinforcement (chopped graphite fibers) | 13.3 |
| Initiator [2,5-dimethyl-2,5-di(t-butyl peroxy) hexane] | 0.3 |
| Stabilizer (Ionol) | 0.1 |
| Other Additive (Vinyl Silane) | 0.3 |
| | 100.0 |

[1]The same type of polyester as that used in Example 1.

The blended composition was formed into small disc-shaped preforms which were thermoplastic in nature. The preforms were then compression molded at 325°F (163°C) and 100 psi to convert the composition to a thermoset condition and to form a shaped article.

EXAMPLE 6

Following a similar procedure as described in Example 1, a flame retardant composition was prepared by substituting a halogenate polyester which contains the same type of polyester as that used in Example 2 in accordance with the following formulation:

| Component | Parts by Weight |
|---|---|
| Polyester[1] | 32.0 |
| Crosslinking Agent (condensate of HMDAA) | 8.0 |
| Inorganic Filler (CaSiO$_3$-Calcium Metasilicate) | 59.7 |
| Reinforcement (chopped glass fibers) | 17.7 |
| Initiator [2,5-dimethyl-2,5-di(t-butylperoxy) hexane] | 0.3 |
| | 117.7 |

[1]The commercially available polyester was the brominated derivative of the same type of polyester as that used in Example 2.

The blended mixture was extruded and pelletized in the same manner as that described in connection with Example 1. The dry-appearing, free-flowing product thus obtained had the capability of being injection molded to a thermoset product having flame retardant properties.

EXAMPLE 7

This example illustrates another method of preparing a flame retardant composition through the selective use of fillers and flame retardant additives. Again following a similar procedure as described in Example 1, a flame retardant composition was prepared from the following composition:

| Component | Parts by Weight |
|---|---|
| Polyester[1] | 16.0 |
| Crosslinking Agent (condensate of HMDAA) | 16.0 |
| Calcium Metasilicate | 18.0 |
| Aluminum Trihydrate | 46.0 |
| Zinc borate | 2.0 |
| Antimony Trioxide | 2.0 |
| Reinforcement (chopped glass fibers) | 17.7 |
| Initiator [2,5-dimethyl-2,5-di(t-butyl peroxy) hexane] | 0.3 |
| Stabilizer (Ionol) | 0.03 |
| | 118.33 |

[1]The same type of polyester as that used in Example 1.

The blended mixture was extruded and pelletized in the same manner as described above in connection with Examples 1 and 6 to yield the same type of dry-appearing, free-flowing product. In addition, the product was found to be self-extinguishing, Group O by Underwriters' Laboratories, Inc. Subject 94 Self-Extinguishing Test for Plastics.

EXAMPLE 8

Following a similar procedure as described in Example 2, an organic fiber reinforced flame retardant composition was prepared by melt blending the following ingredients:

| Component | Parts by Weight |
| --- | --- |
| Polyester[1] | 23.54 |
| Crosslinking Agent (condensate of HMDAA) | 10.12 |
| Calcium Metasilicate | 19.32 |
| Aluminum Trihydrate | 26.57 |
| Zinc Borate | 1.81 |
| Antimony Trioxide | 1.81 |
| Initiator [2,5-dimethyl-2,5-di(t-butyl peroxy) hexane] | 0.25 |
| Stabilizers (Ionol) | 0.04 |
| (DSTDP) | 0.25 |
| (tetra [methylene-3-(3,5-di-t-butyl-4-hydroxyphenyl) propionate]methane) | 0.11 |
| Other Additives (Pigment) | 0.96 |
| (Silane) | 0.25 |
| | 85.03 |

[1]The same type of polyester as that used in Example 1.

The blended mixture was then used to impregnate a continuous length of polyester yarn having a denier of 4400. The impregnation step was followed by solidification and pelletizing. The resultant pelletized composition containing 16.8 wt. % polyester fibers based on the total weight of the composition was dry-appearing, free-flowing and thermoplastic in nature.

In place of the polyester yarn other organic fibers can be used such as nylon, cellulose, polyvinyl acetate and the like. The organic fibers can also be used in combination with inorganic fibers, e.g., glass fibers.

EXAMPLES 9–13

Five separate compositions were prepared using the same procedure, ingredients and amounts of ingredients as described in Example 1 except that in the place of calcium silicate as the inorganic filler a different filler was substituted therefor as indicated below:

Example 9: Calcium carbonate
Example 10: Magnesium silicate
Example 11: Aluminum silicate
Example 12: Hydrated kaolin
Example 13: Silica Each of the foregoing mixtures was dry-appearing and free-flowing which is characteristic of the compositions of this invention after extruding and pelletizing.

EXAMPLE 14

A composition in accordance with this invention is prepared using a similar procedure as described in Example 1 by blending the following ingredients:

| Component | Parts by Weight |
| --- | --- |
| Polyester[1] | 24.9 |
| Crosslinking Agent (N,N'-methylene bis acrylamide) | 24.9 |
| Inorganic Filler (CaCO$_3$) | 34.6 |
| Reinforcement (chopped glass fibers) | 15.0 |
| Initiator [2,5-dimethyl-2,5-di(t-butyl peroxy) hexane] | 0.26 |
| Stabilizer (Ionol) | 0.03 |
| Other Additive (Vinyl silane) | 0.20 |
| | 99.89 |

[1]The same type of polyester as used in Example 1.

The above mixture is extruded into strands which are solidified and pelletized. The resulting composition is a dry-appearing and free-flowing thermoplastic composition which is capable of being cured into a thermoset condition.

EXAMPLES 15–21

Seven separate compositions are prepared using a similar procedure as described in Example 1 and the same ingredients and amounts of ingredients as those used in Example 14 except that in each instance a different crosslinking agent is substituted for N,N'-methylene bis acrylamide as indicated below.

Example 15: Ethylene glycol dimethacrylate
Example 16: Tetraethylene glycol dimethacrylate
Example 17: Trimethylol propane triacrylate
Example 18: Pentaerythritol tetramethacrylate
Example 19: Bisphenol "A" dimethacrylate
Example 20: Tetramethylene diacrylate
Example 21: Tetramethylene dimethacrylate Each of the foregoing mixtures is dry-appearing and free-flowing on being extruded and pelletized as described in Example 1.

Thus, having described the invention in detail it will be understood by those skilled in the art that certain variations and modifications may be made without departing from the spirit and scope of the invention as described herein and in the appended claims.

What is claimed is:

1. A reinforced polyester molding composition which is a dry, free-flowing, self-feeding solid at room temperature, fusible and injection moldable at temperatures between about 65°C and about 107°C and crosslinkable to the thermoset state upon heating at substantially higher temperatures, comprising:

a. a polyunsaturated polyester resin having a melting point above about 65°C;

b. in proportions by weight of from about 5/95 to about 70/30 based upon said polyester resin, an acrylic crosslinking agent of one of the following types:

(i)
$$R^2{-}C{-}\begin{matrix}N{-}C{-}C{=}CH_2 \\ | \; \| \; | \\ R^1 \; O \; R^1\end{matrix}$$
$$R^2 / \quad \backslash N{-}C{-}C{=}CH_2$$

wherein each $R^1$ independently is H or $CH_3$; and each $R^2$ independently is H; $C_1$ to $C_4$ alkyl; phenyl; phenyl substituted with any one or more of $C_1$ to $C_4$ alkyl, halogen, hydroxy and nitro groups; $C_4$ to $C_6$ cycloalkyl; or a radical corresponding to the structure $$CH_2{=}C{-}C{-}N{-}(R^{12}{)}_{0-1}$$
$$\begin{matrix}| \; \| \; | \\ R^{11} \; O \; R^{11}\end{matrix}$$

wherein each $R^{11}$ independently is H or $CH_3$ and $R^{12}$ is a straight or branched chain $C_1$ to $C_8$ alkylene group;

(ii) 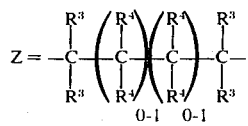

wherein $n$ is an integer from 2 to 10 and Z is a polyvalent aliphatic, cycloaliphatic or aromatic nuclei; the aliphatic nuclei being defined by

wherein each $R^3$ and $R^4$, independently, is H or $C_1$ to $C_4$ alkyl; the cycloaliphatic nuclei being cyclohexylene or bismethylene cyclohexane; and the aromatic nuclei being phenylene or phenylene substituted with up to 4 methyl groups, or bismethylene benzene or bismethylene benzene substituted with up to 4 methyl groups; and iii. the condensation product of hydroxymethyl diacetone acrylamide having a molecular weight in the range of 400 to 3000;

c. from about 0.01 to about 5% based upon the combined weight of (a) + (b) of an organic peroxide initiator having a 10 hour half-life temperature above about 93°C;

d. from about 5 to 75% by weight based upon the total composition of reinforcing fibers; and e. from about 5 to 75% by weight based upon the total composition of solid filler material, provided that the combined weight of (a) + (b) amounts to at least 20% of the total composition.

2. The composition according to claim 1 wherein the proportion of (b) to (a) is from about 10/90 to 50/50 by weight.

3. The composition according to claim 1 wherein (c) comprises about 0.1 to 2% of the combined weight of (a)+(b).

4. The composition of claim 1 wherein (c) is chosen from the group consisting of t-butyl peracetate; methyl ethyl ketone peroxides; t-butyl perbenzoate; 2,5-dimethyl-2,5-bis(t-butylperoxy)hexane; di-t-butyl peroxide; 2,5-dimethyl-2-5-bis(t-butyl peroxy) hexyl-3; 2,4-pentanedione peroxide; t-butyl hydroperoxide; 2,5-dimethyl-2,5-bis(benzoylperoxy) hexane; t-butyl percrotonate; di-t-butyl diperoxyphthalate; a,a'-bis(t-butylperoxy) diisopropylbenzene; n-butyl-4,4-bis(t-butylperoxy)valerate; dicumyl peroxide; 1,1,3,3-tetramethyl butyl hydroperoxide; cumene hydroperoxide; 2,5-dimethyl hexane-2,5-dihydroperoxide; acetyl acetone peroxide; and t-butyl peroxy isopropyl carbonate.

5. The composition of claim 1 wherein (d) is chosen from the groups consisting of glass fibers, asbestos, synthetic organic fibers and graphite fibers.

6. The composition of claim 1 wherein a minor amount of a stabilizer is also present in said composition to safeguard same against premature crosslinking.

7. The composition according to claim 6 wherein said stabilizer is hydroquinone, hydroquinone monomethyl ether, butylated hydroxy toluene, butylated hydroxy anisole, 2,6-di-t-butyl-4-methyl phenol or mixtures thereof.

8. The composition of claim 1 wherein said molding composition is fusible at temperatures below about 93°C.

9. The molding composition of claim 1 wherein said crosslinking agent is the condensate of hydroxymethyl diacetone acrylamide having a molecular weight in the range of 400 to 1000.

10. The molding composition of claim 1 wherein said solid filler material is calcium carbonate, calcium silicate, clay, aluminum silicate, magnesium silicate, silica, hydrated kaolin, wood flour, aluminum trihydrate, antimony trioxide, zinc borate, mica or mixtures thereof.

11. A molding composition which is a self-feeding solid at room temperature and has a melting point above about 65°C comprising:

a. a solid polyunsaturated thermosettable polyester which is a condensation product of at least one dihydric alcohol and at least one dicarboxylic acid or ester-forming derivative thereof, b. a crosslinking agent which is methylene bis acrylamide, ethylene glycol diacrylate, ethylene glycol dimethacrylate, tetraethylene glycol dimethacrylate, trimethylol propane triacrylate, pentaerythritol tetramethacrylate, bisphenol A dimethacrylate, tetramethylene diacrylate, tetramethylene dimethacrylate or the condensate of hydroxymethyl diacetone acrylamide having a molecular weight of 400 to 3000, wherein the weight ratio of said polyester to said crosslinking agent ranges from about 30/70 to 95/5, c. a peroxide-type initiator having a 10 hour half-life above about 93°C in an amount of about 0.1 to 2% based on the combined weight of said polyester and crosslinking agent, d. reinforcing fibers in an amount of about 5 to 75% based on the weight of said composition, and e. inorganic filler material in an amount from about 5 to about 75% by weight of said composition wherein the combined weight of said polyester and said crosslinking agent is maintained at at least 20% by weight of said composition.

12. The composition according to claim 11 wherein said crosslinking agent is the condensate of hydroxymethyl diacetone acrylamide having a molecular weight in the range of 400 to 1000.

13. The composition of claim 11 wherein a minor amount of a stabilizer is also present in said composition to safeguard same against premature crosslinking.

14. The composition according to claim 11 wherein said filler material is calcium carbonate, calcium silicate, clay, aluminum silicate, magnesium silicate, silica, hydrated kaolin, wood flour, aluminum trihydrate, antimony trioxide, zinc borate, mica or mixtures thereof.

15. The composition according to claim 13 wherein the said filler material comprises a mixture of aluminum hydrate, zinc borate, and antimony trioxide.

16. The composition according to claim 13 wherein said filler material is present in an amount of about 15 to 75% by weight of said composition.

* * * * *